Aug. 31, 1937.  L. UBBELOHDE  2,091,896
ARRANGEMENT FOR TESTING THE VISCOSITY OF LIQUID MATERIALS
Filed July 17, 1936
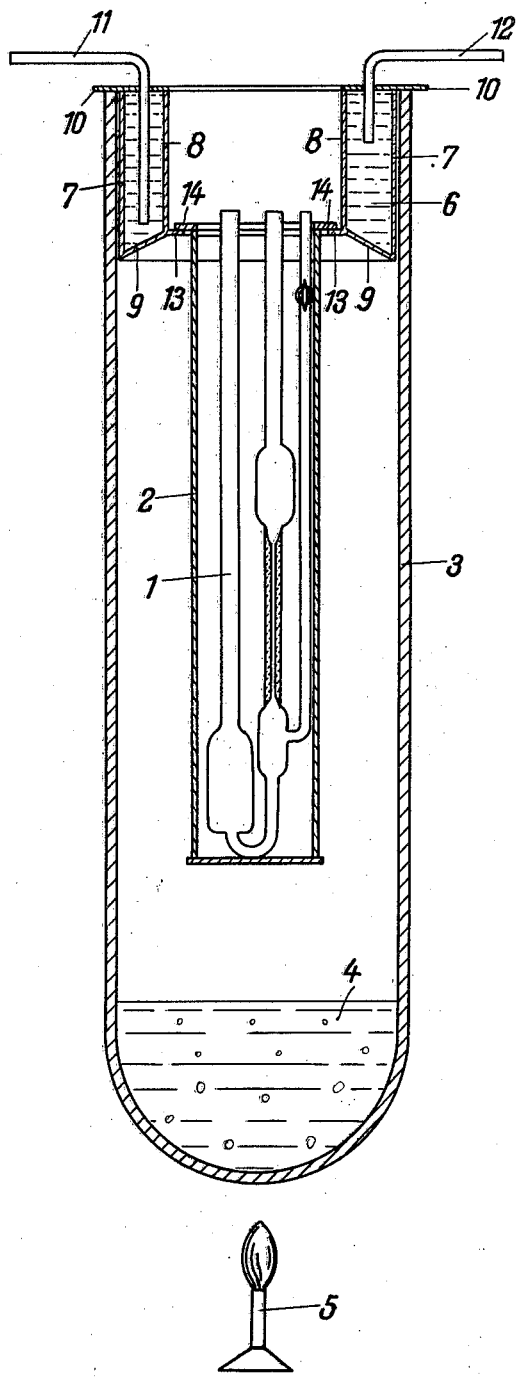
Inventor:
Leo Ubbelohde,
By Frank S. Ashleman,
attorney.

Patented Aug. 31, 1937

2,091,896

UNITED STATES PATENT OFFICE 2,091,896

ARRANGEMENT FOR TESTING THE VISCOSITY OF LIQUID MATERIALS

Leo Ubbelohde, Berlin-Charlottenburg, Germany

Application July 17, 1936, Serial No. 91,178

7 Claims. (Cl. 265—11)

For determination of viscosity of liquids, particularly of lubricating oils and the like, the temperature is an important factor since the viscosity decreases with increasing temperature and the decrease differs widely and depends on the character of the liquid, viz. oil.

The determined numbers of viscosity, therefore, are only significant when the temperature of determination is indicated.

Ordinarily the viscosity numbers are determined according to the character of the oil, at temperatures of 20, 50, or 100 degrees centigrade. I could however state that it is not necessary to make the test just at these temperatures, but that it is sufficient to test the liquid at two different, distinct temperatures, and that it is possible to calculate from these results the true viscosity at 20, 50 or 100 degrees respectively. In every case however, the temperature must be kept constant during the entire test, since variations cause alterations of the viscosity values.

This invention is an improvement of the viscosimeter of narrow dimensions which is the object of my former Patent No. 2,048,305. This viscosimeter can be arranged within a surrounding vessel filled with a liquid which is kept by suitable heating means on the level of the testing temperature. Certain further means are well known in the art to distribute the surrounding liquid by means of stirring and the like to effect and maintain a defined and constant temperature during the determination, which is however, difficult and requires a certain experience, since it is necessary to observe at one and the same time the testing material as well as the behavior of the surrounding liquid and the source of heat.

Now I found it very advantageous to provide within the surrounding casing a liquid of sharp and low boiling point means to produce vapors of such liquid and further means to consume the evaporating heat of the vapors and to lead the liquefied vapors back to the bulk of the liquid.

According to the discoveries outlined above it is sufficient to use for one and the same testing material every liquid substance showing a reasonable low boiling point from about room temperature up to about 200 degrees centigrade and even above that temperature; only care must be taken that no decomposition or any other alteration of the heating liquid compound takes place during the experiment. A lot of substances have been proved suitable; for example well defined aliphatic or aromatic hydrocarbons, their substitution products, for instance, halogenation products, or amines, for instance, aniline, monovalent or polyvalent alcohols, ethers, esters of aliphatic or aromatic acid, and many other compounds provided they have a sharp boiling point at a reasonable low temperature.

From the values obtained at the boiling point of the heating substances, whatever their boiling point may be, I can calculate as well the very values of the testing material at 20, 50, or 100 degrees. The invention has the advantage that the test becomes much easier and can be made by unskilled persons, since the sources of faults hitherto experienced are eliminated.

My invention further consists in a special device for condensing the developed vapors which is located at the top of the casing filled with the constantly boiling substance itself and surrounding the viscosimeter or its casing respectively. This part of the device is provided with an inflow for introducing any suitable cooling means, for example cold water, and an outflow to lead off the water charged by the evaporating heat of the vapors which is freed when the vapors are condensed by cold water. The cooling device can be simply put on the top of the surrounding heating vessel and easily removed from it, a collar being provided at the cooling device fitting on the upper edge of the heating vessel. The viscosimeter or its casing if such is provided, is attached to the cooling device, this latter having suitable means adapted to fix the viscosimeter in a suitable level to secure that it is entirely surrounded by the vapors developed from the boiling liquid.

I prefer a ring shaped cooling device which can be provided with an annular inner flange at the bottom on which the viscosimeter can be easily removably put by means of projections for example an outer flange at the top of the viscosimeter.

Furthermore I prefer a cooling vessel having a bottom outwardly inclined so that the film of condensed liquid runs by reason of adhesion firstly outward, in oblique direction until it reaches the outer edge of the bottom of the cooling vessel; hence the liquid drops down into the bulk of the liquid. In this way the stream of falling condensed liquid is limited to the outer zone of the surrounding vessel, whilst the inner zone adjacent to the viscosimeter is exclusively reserved to the rising vapors.

Further particulars may be seen from the annexed diagrammatical drawing which however only illustrates my invention merely by way of example without limiting the scope of the invention.

The viscosimeter 1, preferably surrounded by a casing 2, filled with gaseous fluid for example air is arranged within a vessel 3 partially filled with a suitable liquid 4 of sharp boiling point. The liquid is heated by a gas burner 5. At the top of the vessel 3 a vessel 6 of annular cross section, having longer outer walls 7 and shorter inner walls 8 and an oblique bottom 9, is arranged. At the top of the wall projection 10 secures the fit on the upper edge of vessel 3. An inlet tube and an outlet tube are provided for the cooling means. At the bottom of the inner wall 8 projections 13 of any suitable kind are provided which correspond to projections 14 at the top of the viscosimeter 1 or its casing 2 respectively which secure a proper and easily detachable arrangement of the viscosimeter within the surrounding vessel.

The mode of operation is as follows:

Firstly I fill the vessel 3 with a liquid of the mentioned properties to such a level that it does not touch the viscosimeter brought into position. Then I fill the viscosimeter with a suitable quantity of the testing material, then I connect the tube 11 with a duct of fresh water, and tube 12 with a hose to lead off the warmed water, and finally I put the vessel 6 into the top section of the vessel 3 and the viscosimeter 1 into the inner space of the vessel 6. By the burner 5 the content of the vessel 3 is heated up to the boiling point, the vapors rise gradually encircling and heating the viscosimeter exactly to their characteristic temperature, and reach finally the vessel 6 where they are condensed to liquid condition. The drops fall down to the liquid at the bottom of the vessel 3 where they are again vaporized. After a certain time the content of the viscosimeter has reached the temperature of the boiling point of the liquid 4, and then the determination of viscosity may take place. Afterwards the same determination is repeated with liquid 4 having a different boiling point. From both the results the viscosities at 20, 50, 100 degrees can be calculated. Of course only a single liquid 4 may be used having a boiling point of 20, 50 or 100 degrees, but such liquids are rare and generally do not show exactly such boiling points.

What I claim is:

1. An arrangement for testing the viscosity of liquid materials comprising a vessel filled with a liquid of constant sharp boiling point, a viscosimeter arranged within said vessel above the level of said liquid, means for developing vapors from said liquid and means arranged at the top of the vessel and adapted to consume and lead off the evaporating heat of the developed vapors.

2. An arrangement for testing the viscosity of liquid materials comprising a vessel filled with a liquid of constant sharp boiling point, a viscosimeter arranged within said vessel above the level of said liquid, means adapted to produce vapors from said liquid, and a vessel of annular cross section arranged at the top of the surrounding vessel and provided with an inlet and an outlet tube for a cooling medium.

3. A device for testing the viscosity of liquid materials, comprising a container for a liquid, a heat source for heating the lower portion of said container, a vessel arranged at the top of said container, means to produce a flow of cooling fluid through said vessel, and a viscosimeter arranged within said container between its bottom and the vessel containing the cooling fluid.

4. A device for testing the viscosity of liquid materials, comprising in combination a container for a liquid, a heat source for heating the lower portion of said container, an annular vessel arranged at the top of said container and provided with an inlet and an outlet tube, and a viscosimeter arranged within the container at a level between the heated portion of the container and the upper annular vessel.

5. A device for testing the viscosity of liquid materials, comprising in combination a container for a liquid, a heat source for heating the lower portion of said container, an annular vessel arranged at the top of said container and provided with an inlet and an outlet tube and a downwardly and outwardly inclined bottom, and a viscosimeter arranged between said container at a level between the heated portion of the container and the upper annular vessel.

6. A device for testing the viscosity of liquid materials comprising in combination with a container, an annular vessel at the top of said container and having inner and outer walls and a bottom, said vessel being provided with an inlet and an outlet tube, outwardly directed projections at the top of its outer wall and adapted to fit on the upper edge of the container, said inner wall being shorter than the outer wall and provided with inwardly directed projections at its bottom, a viscosimeter arranged within said container and provided at the top with outwardly directed projections adapted to fit on said inwardly directed projections of the annular vessel, and means for heating the lower portion of the container.

7. A device for testing the viscosity of liquid materials comprising in combination with a container for liquid to be heated associated with means for heating the liquid, a vessel at the top of the container provided with an inlet and an outlet tube and an outwardly and downwardly inclined bottom, and a viscosimeter attached with its top portion to the bottom portion of the vessel.

LEO UBBELOHDE.